(12) United States Patent
Seely et al.

(10) Patent No.: US 10,885,689 B2
(45) Date of Patent: Jan. 5, 2021

(54) SYSTEM AND METHOD FOR AUGMENTED REALITY OVERLAY

(71) Applicant: General Electric Company, Schenectady, NY (US)

(72) Inventors: William Forrester Seely, Taylors, SC (US); Glen William Brooksby, Glenville, NY (US); Sandra Beverly Kolvick, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/029,143

(22) Filed: Jul. 6, 2018

(65) Prior Publication Data

US 2020/0013206 A1    Jan. 9, 2020

(51) Int. Cl.
| | | |
|---|---|---|
| G06T 11/00 | (2006.01) | |
| G06T 11/60 | (2006.01) | |
| G06F 40/169 | (2020.01) | |

(52) U.S. Cl.
CPC ............ G06T 11/60 (2013.01); G06F 40/169 (2020.01)

(58) Field of Classification Search
None
See application file for complete search history.

(56) References Cited

U.S. PATENT DOCUMENTS

| | | | |
|---|---|---|---|
| 4,599,611 A | 7/1986 | Bowker et al. | |
| 5,568,167 A | 10/1996 | Galbi et al. | |
| 5,774,172 A | 6/1998 | Kapell et al. | |
| 7,400,752 B2 | 7/2008 | Zacharias | |
| 7,859,705 B2 | 12/2010 | Gokaraju et al. | |
| 8,013,304 B2 | 9/2011 | Haigh et al. | |
| 8,730,354 B2 | 5/2014 | Stafford et al. | |
| 8,832,741 B1 | 9/2014 | Bota et al. | |
| 9,204,181 B2 | 12/2015 | Ress et al. | |
| 9,350,780 B2 | 5/2016 | Good et al. | |
| 2006/0083421 A1* | 4/2006 | Weiguo ................... G06K 9/32 382/154 |
| 2008/0084473 A1 | 4/2008 | Romanowich | |

(Continued)

FOREIGN PATENT DOCUMENTS

| | | |
|---|---|---|
| EP | 2390795 | 11/2011 |
| WO | 2015069737 A2 | 5/2015 |

(Continued)

OTHER PUBLICATIONS

PCT; International Search Report; dated Oct. 10, 2019, pp. 1-14.

*Primary Examiner* — Martin Mushambo
(74) *Attorney, Agent, or Firm* — Fletcher Yoder, P.C.

(57) ABSTRACT

The present disclosure generally relates to a system that includes a processor configured to execute an augmented reality (AR) translator and visualizer system. The AR translator and visualizer system is configured to receive a language file that includes content, determine a background in the language file, remove the background, and retrieve the content from the language file. Moreover, the AR translator and visualizer system is configured to overlay the content onto a real world view via a display to form AR content that includes the content merged with the real world view. Furthermore the AR translator and visualizer system is configured to cause the system to display the real world view overlaid with the content via the display.

20 Claims, 4 Drawing Sheets

(56) References Cited

U.S. PATENT DOCUMENTS

| | | | |
|---|---|---|---|
| 2010/0091036 A1* | 4/2010 | Wright | G06T 19/006 345/633 |
| 2013/0135353 A1* | 5/2013 | Wheeler | G09G 3/003 345/660 |
| 2013/0281208 A1 | 10/2013 | Lyons et al. | |
| 2014/0015827 A1* | 1/2014 | Rapoport | G06T 11/60 345/419 |
| 2014/0081634 A1 | 3/2014 | Forutanpour et al. | |
| 2014/0152698 A1* | 6/2014 | Kim | G06T 19/006 345/633 |
| 2015/0088703 A1* | 3/2015 | Yan | G06F 3/147 705/28 |
| 2015/0109338 A1* | 4/2015 | McKinnon | G06F 16/5866 345/633 |
| 2015/0153572 A1* | 6/2015 | Miao | G02B 27/017 345/8 |
| 2015/0234477 A1* | 8/2015 | Abovitz | G06F 16/7837 382/103 |
| 2015/0325051 A1* | 11/2015 | Bhuruth | G06T 19/006 345/633 |
| 2016/0045834 A1* | 2/2016 | Burns | A63H 3/52 446/268 |
| 2016/0048203 A1* | 2/2016 | Blum | G06F 3/012 104/84 |
| 2016/0163059 A1* | 6/2016 | Xie | G06T 7/11 382/173 |
| 2017/0032575 A1* | 2/2017 | Yeoh | G06K 9/52 |
| 2017/0148222 A1* | 5/2017 | Holzer | H04N 13/243 |
| 2017/0178686 A1 | 6/2017 | Li et al. | |
| 2017/0244956 A1* | 8/2017 | Stiglic | H04N 13/156 |
| 2017/0315364 A1* | 11/2017 | Masumoto | H04N 13/106 |
| 2018/0101992 A1* | 4/2018 | Akselrod | G06T 19/20 |
| 2018/0122080 A1* | 5/2018 | Zaitsev | G06T 7/174 |
| 2018/0137681 A1* | 5/2018 | Chang | G06F 3/011 |
| 2018/0218545 A1* | 8/2018 | Garcia | G06F 3/0346 |
| 2018/0232888 A1* | 8/2018 | Thevenet | G06T 7/194 |
| 2018/0276896 A1* | 9/2018 | Launonen | G06K 9/00442 |
| 2018/0309808 A1* | 10/2018 | Andon | H04L 65/4053 |
| 2018/0350146 A1* | 12/2018 | Gervasio | G06T 15/205 |

FOREIGN PATENT DOCUMENTS

| | | |
|---|---|---|
| WO | 2016073135 A1 | 5/2016 |
| WO | 2017004397 A1 | 1/2017 |

* cited by examiner

SYSTEM AND METHOD FOR AUGMENTED REALITY OVERLAY

BACKGROUND OF THE INVENTION

The subject matter disclosed herein relates to augmented reality, and more specifically, to systems and methods for augmented reality overlay.

Certain descriptive files may include engineering drawings. Engineering drawings and other technical drawings pertain to various types of systems or components thereof. For example, engineering drawings may visually describe systems, such as power production systems, as well as equipment and parts that may be included in power production systems. In some cases, a person may be unfamiliar with, or not able to recognize, certain components in the systems, or how a real world system or components thereof relate to engineering drawings. It would be advantageous to provide a way to improve engineering drawings and other descriptive files.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system that includes a processor configured to execute an augmented reality (AR) translator and visualizer system. The AR translator and visualizer system is configured to receive a language file that includes content, determine a background in the language file, remove the background, and retrieve the content from the language file. Moreover, the AR translator and visualizer system is configured to overlay the content onto a real world view via a display to form AR content that includes the content merged with the real world view. Furthermore the AR translator and visualizer system is configured to cause the system to display the real world view overlaid with the content via the display.

In a second embodiment, a processor implemented method includes receiving a language file that includes content, determining a background in the language file, removing the background, and retrieving the content from the language file. The method also includes overlaying the content onto a real world view via a display to form augmented reality (AR) content that includes the content merged with the real world view. Moreover, the method includes displaying the augmented reality content via the display.

In a third embodiment, a non-transitory, computer-readable medium, includes processor-implementable instructions that are configured to cause a processor to receive a language file that includes content, determine a background associated with the content, remove the background, retrieve the content, and receive a real world view. The instructions are also configured to cause a processor to overlay the content onto the real world view to form augmented reality (AR) content. Furthermore, the instructions are configured to cause a processor to display the augmented reality content via a display operatively coupled to the processor.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The techniques described herein provide for systems and methods that parse and display augmented reality content. More specifically, the techniques described herein provide for overlaying content, such as, but not limited to, engineering drawings, images, videos, and/or text, onto a real world view. For instance, as described below, a file may be parsed that includes a variety of content to be overlaid onto the real world view. The content may include engineering drawings, tools, text, other displayable content, or a combination thereof. The content may be presented on top of a real world view that includes real world items that correspond to the content. For instance, an engineering drawing of a portion of a system may be overlaid over a real world view of a portion of a corresponding system. The user may modify the size and orientation of the overlay content to so that it becomes better aligned with the real world view, which may enable the user to identify parts or components of the system. Furthermore, the presentation of the overlay content may be adjusted based on detected motion of the electronic device on which the real world view and overlay content is displayed.

Figure 1:
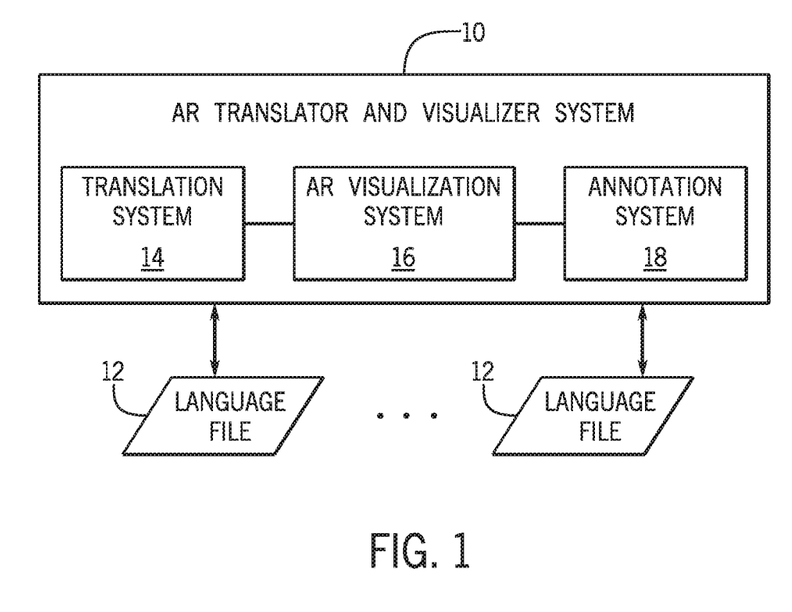
FIG. 1 is a block diagram of augmented reality translator and visualizer system, in accordance with an embodiment of the present disclosure.

Turning now to FIG. 1, the figure illustrates an embodiment of an augmented reality (AR) translator and visualizer system 10. The AR translator and visualizer system 10 may receive content, such as one or more files 12, and cause the content to be overlaid onto a real world view. The real world view may include one or more images captured via a camera of an electronic device. Keeping this in mind, the AR translator and visualizer system 10, as illustrated, includes a translation system 14, an AR visualization system 16, and an annotation system 18. Before elaborating on each of the translation system 14, the AR visualization system 16, and the annotation system 18, the files 12 will be discussed in more detail.

Files 12, e.g., language files, may be data files associated with a programming language, which describe may describe a page in terms of geometrical objects or shapes, such as lines, arcs, and circles, present on the page. For instance, the language may be an object-oriented programming language which may include a page description language, such as PostScript language, that describes a layout and content of a printed page. In other words, the files 12 may describe content within individual pages of the files 12 without utilizing a bit map. As non-exhaustive examples, the files 12 may be Portable Document Format (PDF) files, Portable Network Graphics (PNG) files, Graphics Interchange Format (GIF) files, AutoCAD DXF files, DWG files, HTML files, or a combination thereof. In other embodiments, the files may include any file that is displayable by a computing system, including bit maps, JPEGs, and so on.

The language files 12 may include several forms of content, such as shapes, text, and the like. Several categories of content that may be included in the language files include, but is not limited to, engineering drawings, schematics, blueprints, text, and/or images. For instance, the language files 12 may include drawings and diagrams relating to a system or components thereof. Additionally, the language files 12 may describe drawings of tools, such as a protractor, which may be overlaid onto real world content and to enable a user to make a measurement regarding a physical object. As another example, a tool included in the language files 12 may provide measurement lines that form a scale that may be used to measure distances.

The AR translator and visualizer system 10 may receive the language files 12 and process the "code" in the language files 12 to extract images and text that may be described by the language files 12. In particular, the AR translator and visualizer system 10, as illustrated in FIG. 1, includes a translation system 14. The translation system 14 may first process content described in the language files 12. For example, the language files 12 may include code, such as PostScript code, describing images, characteristics of the images, and content within the images. For instance, a background within an image may be described by the language files 12. In some examples, an image may include multiple layers overlaid on top of each other. Each layer may define or otherwise represent portions of the image. The translation system 14 may parse the content within the language files 12. For instance, the translation system 14 may parse the files 12 to identify portions of the images, for example, based on objects and/or layers in the language files 12 used to describe the various elements or portions of the images. In other words, the translation system 14 may determine the content (e.g., background, images, text, and so on) within the language files 12 and determine how the content appears on the various pages described by the language files 12.

In addition to determining the content described by the language files 12, the translation system 14 may modify the content for later use and store the modified content, for example, in internal memory while leaving the files 12 untouched. For example, the translation system 14 may remove certain objects described within the language files 12. In other words, the translation system 14 may remove portions of the content from the language files 12 that would not be displayed later. As an example, the translation system 14 may determine a background of the content within the image file and remove the background. More specifically, in some cases, a background may be a layer in an image or defined by alpha channels associated with pixels or objects in the image. The translation system 14 may determine the presence of a background layer and remove the background layer. For instance, the translation system 14 may treat or render the background as transparent. Accordingly, the translation system 14 may retrieve content in the language files 12, such as images, by removing the background(s) from the content of the image files 12.

Content dissociated from backgrounds may then be overlaid into a real world view. For example, the AR translator and visualizer system 10 may include an AR visualization system 16, which may receive content from the translation system 14. For example, the AR visualization system 16 may receive images and text from which the background has been removed. Additionally, the AR visualization system 16 may receive data regarding a real world view onto which content from the language files 12 is to be overlaid. For example, the AR visualization system 16 may be communicatively coupled to memory of an electronic device that provides one or more real world views. The real world views, among other things, may include images, such as photographs or frames of a video, which may have been previously recorded or captured in real time. In some cases, the real world views may include computer-generated images. The AR visualization system 16 may merge a real world view with content received from the translation system 14 and cause the merged content to be displayed, for instance, via a display of an electronic device. In other words, the AR visualization system 16 may generate what appears to users as augmented reality content (e.g., a real world view overlaid with other content, such as an image, from a language file 12).

The AR translator and visualizer system 10 may also enable users to modify content originally found in the language files 12 that has been overlaid onto a real world view. For example, content from a language file 12 that is overlaid onto a real world view may be modified by a user. More specifically, users may change the orientation (e.g., rotate or reposition on a display) and size (e.g., enlarge or shrink) of the content as displayed over the real world view. For instance, users may modify an engineering drawing such that items in the engineering drawings are of the same approximate size and orientation as corresponding items presented in the real world view. As other examples, the AR translator and visualizer system 10 may enable users to modify settings related to the content that is overlaid onto real world views. For example, the AR translator and visualizer system 10 provides users with the ability to change the color of the content (e.g., an overlay image or text or both) as well as a transparency of the content as displayed on a display. Furthermore, users may modify the thickness of lines of the content from the language files 12 that is overlaid onto real world views. Moreover, users may add annotations to the overlay content and/or the real world view, such as text or drawings. As yet another example, the AR translator and visualizer system 10 may enable users to highlight overlay content and/or the real world view.

Figure 2:
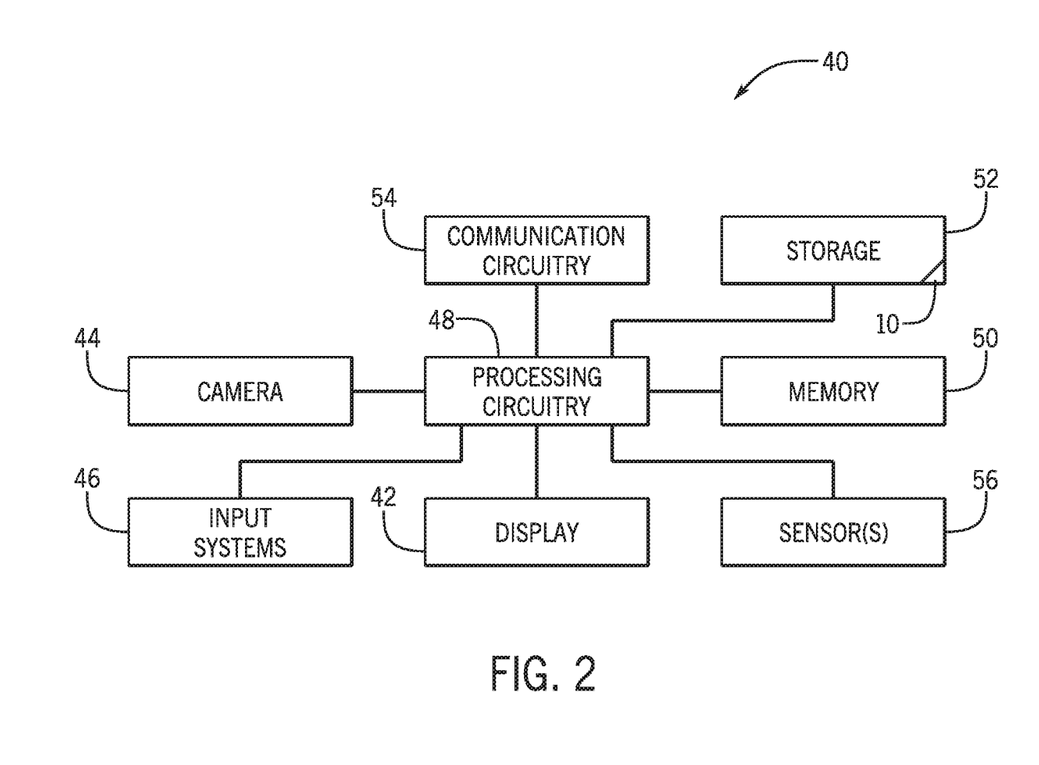
FIG. 2 is a block diagram of an electronic device, in accordance with an embodiment of the present disclosure.

Keeping the discussion of FIG. 1 in mind, FIG. 2 is a block diagram of an electronic device 40 that may include and utilize the AR translation and visualization system 10. In particular, the electronic device includes a display 42 that may display content (e.g., images, text) overlaid onto real world views, which may be captured via a camera 44. The electronic device 40 may be any suitable computing device, such as a handheld computing device, a tablet computing device, a computer (e.g., a desktop or laptop computer), virtual reality goggles, augmented reality goggles, and/or the like.

As illustrated, the electronic device 40 includes the display 42, the camera 44, one or more input systems 46 (e.g., input devices), processing circuitry 48 having one or more processor(s) or processor cores, memory 50, storage 52, communication circuitry 54, and one or more sensors 56. The various components described in FIG. 1 may include hardware elements (e.g., circuitry), software elements (e.g., a tangible, non-transitory computer-readable medium storing instructions), or a combination of both hardware and software elements. In some embodiments, the various depicted components may be combined into fewer components or separated into additional components. For example, the memory 50 and the storage 52 may be included in a single component.

In any case, as depicted, the processing circuitry 48 is operably coupled with the memory 50 and the storage 52. Thus, the processing circuitry 48 may execute instructions stored in local memory 50 and/or the storage 52 to perform operations. For instance, the storage 52 may include the AR translator and visualizer system 10 stored as instructions, and the processing circuitry 48 may execute the AR translator and visualizer to provide augmented reality content for display on the display 42. As such, the processing circuitry 48 may include one or more general purpose microprocessors, one or more application specific processors (ASICs), one or more field programmable logic arrays (FPGAs), or any combination thereof.

The memory 50 and the storage 52 may be tangible, non-transitory, computer-readable mediums that store instructions executable by and data to be processed by the processing circuitry 48. For example, the memory 50 may include random access memory (RAM) and the storage 52 may include read only memory (ROM), rewritable non-volatile memory such as flash memory, hard drives, optical discs, and the like. By way of example, a computer program product containing the instructions may include an operating system or an application program.

Additionally, as depicted, the processing circuitry 48 is operably coupled with the communication circuitry 54. Using the communication circuitry 24, the electronic device 40 may communicatively couple to a network and/or other computing devices. For example, the communication circuitry 54 may connect the electronic device 40 to a personal area network (PAN), such as a Bluetooth network, a local area network (LAN), such as an 802.11x Wi-Fi network, and/or a wide area network (WAN), such as a 4G or LTE cellular network. In this manner, the communication circuitry 54 may enable the electronic device 40 to transmit augmented reality content to a network and/or receive data (e.g., language files 12, real world views) from the network for processing and display (e.g., as augmented reality content) on the electronic device 40.

Furthermore, as depicted, the processing circuitry 48 is operably coupled with input systems 46, which may enable a user to interact with the electronic device 40. The input systems 46 may include buttons, keyboards, mice, track-pads, and/or the like. Additionally or alternatively, the electronic display 42 may include touch components that enable user inputs to the electronic device 40 by detecting occurrence and/or position of an object touching the display 42.

In addition to enabling user inputs, the electronic display 42 may present visual representations of information by display images (e.g., image frames), such as a graphical user interface (GUI) of an operating system, an application interface, a still image, video content, or augmented reality content (e.g., provided via the AR translator and visualizer system 10). As described above, the electronic display 42 may display an image based on corresponding image data (e.g., image data included in one or more language files 12 or real world views). In some embodiments, the image data may be received from other electronic devices 10, for example, via the communication circuitry 24. Additionally or alternatively, the image data may be generated by electronic device 40 using the camera 44. In some embodiments, camera 44 may digitally capture visual representations of proximate physical features (e.g., real world views) as image data.

Furthermore, as illustrated, the electronic device 40 includes one or more sensors 56 that are operatively coupled to the processing circuitry 48. In particular, the sensors 56 may detect motion of the electronic device 40. For instance, the sensors 56 may include an accelerometer, gyroscope, global positioning system (GPS), compass, or other types of sensors that can detect movement of the electronic device 40 imparted by a user. The processing circuitry 48 may utilize data from the sensors 56 to maintain a viewpoint provided in augmented reality content that is displayed via the display 42. For instance, a user may interact (e.g., via the input systems 46) with content from a language file 12 that is overlaid onto a real world view to adjust the orientation of the content (e.g., rotation and/or translation of the content on the display 42) as well as the size of the content (e.g., enlarge or shrink the size of the content). Such user interaction may be undertaken to align the content with a portion of the real world view that corresponds to the content. For example, engineering drawings may be overlaid onto real world items corresponding to the items included in the engineering drawings. Based on data from the sensors 58, the processing circuitry 48 may adjust the orientation of the content as overlaid onto the real world view based on motion associated with the electronic device 40. For instance, when live camera footage (e.g., captured by the camera 44) is used as a real world view, when the user moves the electronic device, the real world view may change. Accordingly, the processing circuitry 48 may utilize the sensors 56 to determine the change in orientation of the real world view and modify the overlaid content so that the content remains aligned with the real world view.

Additionally, by executing the AR translator and visualizer system 10, the processing circuitry 48 may provide automated feature detection. In other words, the AR translator and visualizer system 10 may detect how one or more features within overlay content (e.g., an engineering drawing) correspond to features of a real world view (e.g., a physical item depicted in the engineering drawing). For example, a portion of a system, such as a machine in the system, may be depicted in an image of a language file 12. When the real world view (e.g., an image acquired via the camera 44 of the electronic device 40) includes the machine that is depicted in the image of the language file 12, the processing circuitry 48 may not only recognize that the machine in the image corresponds to a portion of the real world view, but also provide an indication that a portion of the image corresponds to a portion of the real world view. For example, the machine in the real world view, image from the language file 12, or both may be highlighted, circled, or visually indicated in another manner. The AR translator and visualizer system 10 may determine that a portion of an image from a language file 12 corresponds to a portion of the real world view based on proportions of dimensions of content in the image from the language file 12 being the same or similar to proportions of dimensions of a portion of the real world view. As another example, the AR translator and visualizer system 10 may determine that content in the image corresponds to portion of the real world view at least partially based on geographic location (e.g., acquired from the sensors 56). For example, particular language files 12 or content (e.g., images) within language files 12 may be associated with a geographic location, and the AR translator and visualizer system 10 may recognize the geographic location matches or is similar to a geographic location indicated by the sensors 56.

Moreover, processing circuitry 48 may align the one or more portions of the image from the language file 12 with the corresponding portion(s) of real world content. For example, the processing circuitry 48, executing the AR translator and visualizer system 10, may reposition and/or resize the image from the language file 12 on the display 42 such that the recognized portion(s) of the image are overlaid onto the corresponding portion(s) of the real world view.

Figure 3:
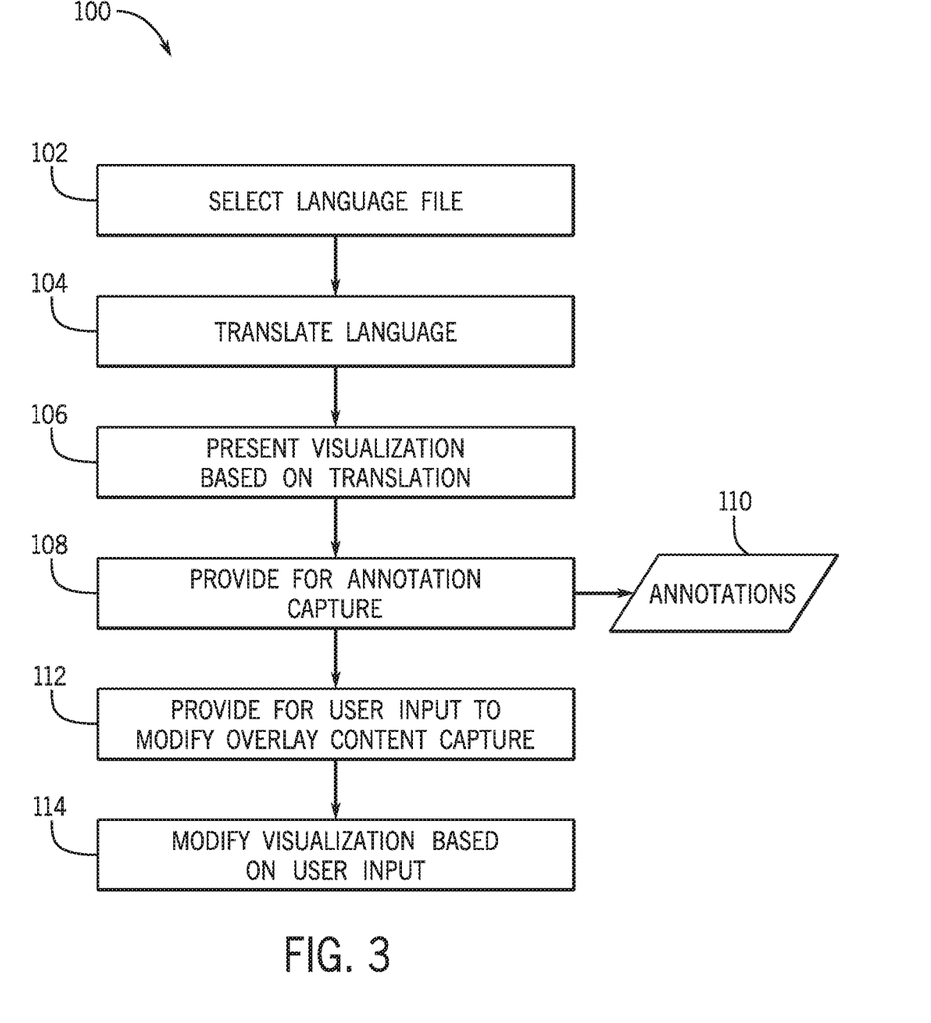
FIG. 3 is a flow chart of a process for providing augmented reality content, in accordance with an embodiment of the present disclosure.

Continuing the discussion of the drawings, FIG. 3 illustrates a flow chart of a process 100 for providing augmented reality content. The process 100 may be implemented as computer instructions or code executable by the AR translator and visualizer system 10 via the processing circuitry 48 of the electronic device 40. Additionally, while portions of the process 100 are described below in one order, in other embodiments, the process 100 may be performed in different orders, and some of the process 100 may not be performed.

At process block 102, a language file 12 may be selected. In other words, the processing circuitry 48 may receive user input indicative of a selection of one or more language files 12. For example, language files 12 may be displayed via the display 42 of the electronic device 40, and a user may select a language file 12 via the input systems 46. Additionally, in some embodiments, the AR translator and visualizer system 10 may provide users an option to select one or more specific pages from a language file 12.

At process block 104, executing the AR translator and visualizer system 10, the processing circuitry 48 may translate the language file 12. For example, as described above, the translation system 14 of the AR translator and visualizer system 10 may process content described in the language files 12, such as images or other features that may be defined as objects. The translation system 14 may also identify portions of the images, for example, based on objects and/or layers in the language files 12 used to describe the various portions of the images. During translation of the language file 12, the translation system 14 may remove backgrounds from images of the language file 12.

At process block 106, the processing circuitry 48 may cause a visualization of content from the language file 12 to be presented based on the translation of the language file. In other words, the processing circuitry 48 may present selective content parsed from the language file 12 via the display 42 of the electronic device 40. For example, the processing circuitry 48 may cause the visualization of content from the language file 12 to be overlaid on a real world view, such as image data captured using the camera 44 or stored on the storage 52 of the electronic device 40.

At process block 108, the processing circuitry 48 may provide for annotation capture. That is, the processing circuitry 48 may enable a user to enter input annotations 110 (e.g., via the input systems 46) to modify augmented reality content that is provided via the display 42. For example, the user may add text, shapes, or drawings to overlay content by using the input systems 46 of the electronic device 40. For example, in embodiments in which the display 42 includes a touchscreen, the user may use a stylus or his or her finger in order to write or draw annotations to the augmented reality content provided via the display 42. As another example of annotations, in some cases, the annotations may also include information included in the content from the language file 12. For instance, the language file 12 may include callout numbers, tolerances, names, and other information related to portions of the content in the language file 12 (e.g., engineering drawings related to a system or parts in the system). Using the AR translator and visualizer system 10, users may select whether to display such annotations with the overlay content. For example, the text content may be recognized as a layer of content in the language file 12, and the translation system 14 may not include such a layer with image content from the language file 12 by default. In such a case, the user may select to display the annotations (e.g., via a user interface provided by executing the AR translator and visualizer system 10). Based on the user input, the processing circuitry 48 may add annotations 110 to the augmented reality content provided via the display 42. For instance, in embodiments in which the annotations include drawings or text entered by user input, the processing circuitry 48 may cause the display 42 to show the annotations based on the user input.

At process block 112, the processing circuitry 48 may provide for user input to modify overlay content to be captured. For instance, in some embodiments, the process 100 may include receiving user input to alter an appearance of overlay content from the language file 12 and modify the overlay content based on the user input. For example, as described above, users may modify the size and orientation of the overlay content on the display 42 of the electronic device 40 via the input systems 46. As another example, the AR translator and visualizer system 10 also allow the user to re-color the displayed overlay image (e.g., to provide better viewing contrast for local lighting conditions and/or display settings (e.g., brightness)). As yet another example, a user may enter input to change the thickness of lines in the drawing of the overlay content, which may aid the user in better visualizing and overlaying depictions of equipment and/or machinery onto equipment and/or machinery in real world views.

At process block 114, the processing circuitry 48 may modify the visualization of the content from the language file 12 based on the user input. For instance, the overlay content may be repositioned, resized, and/or reoriented (e.g., rotated, inverted, made into a mirror image) on the display 42 based on user input. Additionally, the overlay content may be changed to another color and/or the overlay content may be displayed with thicker or thinner lines.

In other embodiments, the process 100 may include more steps. For example, in some embodiments, the process 100 may include receiving, via the processing circuitry 48, user input (e.g., via the input systems 46) indicative of a request to capture a screenshot and thus capture an image of the augmented reality content being displayed via the display 42 when such an input is received. Captured screenshots may subsequently be viewed (e.g., via the display 42), stored (e.g., on the storage 52), and/or sent to other electronic devices (e.g., via the communication circuitry 54).

As another example of additional steps that may be included in the process 100, in some embodiments, the process 100 may include receiving user input to lock an orientation of the overlay content and adjust the overlay content based on motion detected via the sensors 56. For example, a user may adjust the appearance of the overlay content on the display 42 and input (e.g., via the input systems 46) a request to lock the orientation of the overlay content, and the processing circuitry 48 may display the overlay content with the settings associated with the overlay content at the time the user input was made. When data from the sensors 56 indicates that the electronic device 40 has moved, the processing circuitry 48 may cause the overlay content to be presented in a manner that corresponds to the detected movement of the electronic device 40. For example, if the processing circuitry 48 determines that the data from the sensors 56 is indicative of a rotation of the electronic device 40, the processing circuitry 48 may cause the overlay image to be rotated by an amount corresponding with the detected rotation. As another example, based on image data from the camera 44, the processing circuitry 48 may determine that the electronic device has moved closer to, or farther from, content from the real world view. In response, the processing circuitry 48 may respectively shrink or enlarge the overlay content by an amount corresponding to a detected amount by which the real world view has changed. For instance, if a user of the electronic device steps backwards, the items in the real world view may become smaller on the display 42. The processing circuitry 48 may determine a degree to which the items have shrunken (e.g., compare a size of an item in the real world view to a previous size of the item in the real world view), and cause the overlay image to be made smaller by the same or a similar amount as the detect change in size of the items in the real world view.

Figure 4:
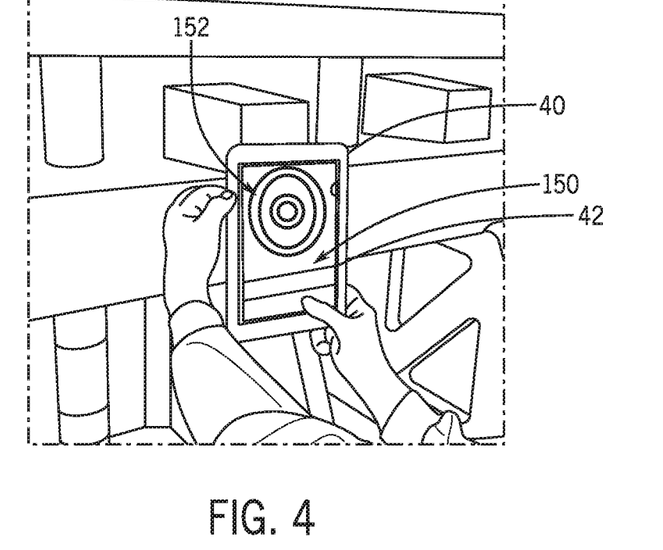
FIG. 4 depicts an embodiment of the electronic device of FIG. 2 executing the augmented reality translator and visualizer system of FIG. 1, in accordance with an embodiment of the present disclosure.

Continuing with the discussion of the AR translation and visualizer system 10, FIG. 4 depicts an embodiment of the electronic device 40 that is executing the AR translation and visualizer system 10. In the illustrated embodiment, a user of the electronic device captures a real world view 150 (e.g., via a camera of the electronic device 10), on which overlay content 152 is overlaid, resulting in augmented reality content that is provided via a display 42 of the electronic device 40. The user may modify the appearance of the overlay content 152 by interacting with the overlay content 152, for example, via a touchscreen (e.g., display 42) or other input systems included in the electronic device 40.

Figure 5:
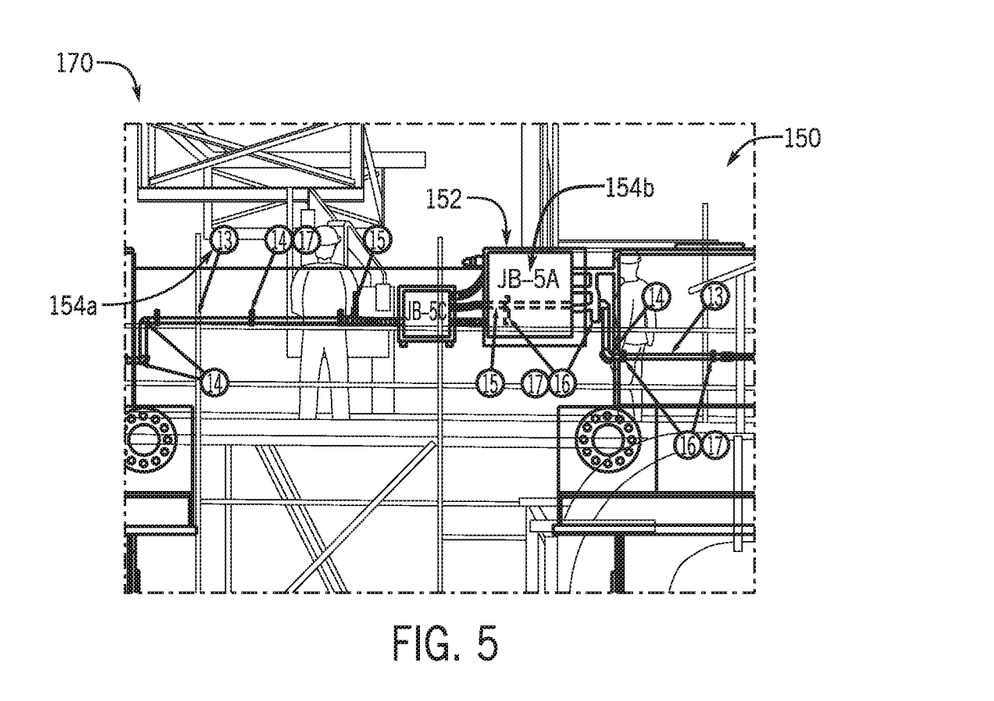
FIG. 5 illustrates an image of augmented reality content that may be generated by the augmented reality translator and visualizer system of FIG. 1, in accordance with an embodiment of the present disclosure.

FIG. 5 illustrates an image 170 of augmented reality content. More specifically, the image 170 includes a real world view 150 (e.g., a plant or facility) onto which overlay content 152 has been overlaid. As illustrated, the overlay content is an engineering drawing that includes several parts that correspond to items physically present in the real world view, some of which may not be visible in the real world view 150. Additionally, FIG. 5 includes annotations 154, such as callout number 154*a* and text 154*b* associated with the overlay content 152. Accordingly, a user of an electronic device that provides the image 170 may be able to discern what components of the real world view 150 are based on the overlay content 152.

Furthermore, it should be noted that the presently disclosed techniques may be applied to video content. For example, content from language files 12 may be overlaid onto several images that make up the frames of video content. Moreover, the presently disclosed techniques may be used with two-dimensional and three-dimensional images. That is, two and three dimensional images from language files 12 may be overlaid onto real world views and displayed via the display 42 of the electronic device 40.

Technical effects of the present disclosure include integrating real world views with overlay content (e.g., images, text) provided in files such as language files. For example, an electronic device utilizing an augmented reality translator and visualizer may receive content (e.g., a language file), provide a portion of the content as an overlay image, which may be displayed on top of a real world view (e.g., an image captured by a camera of the electronic device). Overlay content may be modified on the display. For instance, size and/or orientation of the overlay content may be modified based on user input, which may enable users to align overlay content with objects in the real world view that correspond with the overlay content. By providing for content to be overlaid onto real world views, the techniques described herein may enable users to identify components in complex systems and more quickly evaluate the components.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising a processor configured to execute an augmented reality (AR) translator and visualizer system, wherein the AR translator and visualizer system is configured to:
   receive a language file comprising content;
   determine a background in the language file;
   remove the background;
   retrieve the content from the language file;
   overlay the content onto a real world view via a display to form AR content, wherein the AR content comprises the content merged with the real world view;
   cause the system to display the real world view overlaid with the content via the display;
   receive user input indicative of a request to enlarge, shrink, or move the content with respect to the real world view within the AR content after the AR content has been displayed; and
   enlarge, shrink, or move the content with respect to the real world view based on the user input.

2. The system of claim 1, wherein a language of the language file comprises a page description language.

3. The system of claim 2, wherein the language file comprises a Portable Document Format (PDF) file.

4. The system of claim 1, wherein the AR translator and visualizer system is configured to rotate the content, annotate the content, or a combination thereof within the AR content after the AR content has been displayed.

5. The system of claim 4, wherein the AR translator and visualizer system is configured to rotate the content on the display or to add an annotation to the content based on a second user input received after the AR content has been displayed.

6. The system of claim 1, wherein the AR translator and visualizer system is configured to reposition the content or change a size of the content based on a change to the real world view.

7. The system of claim 1, wherein the content comprises text, at least one image, a set of objects representative of the real world, or a combination thereof.

8. The system of claim 7, wherein the content comprises an engineering drawing.

9. A processor implemented method, comprising:
receiving a language file comprising content;
determining a background in the language file;
removing the background;
retrieving the content from the language file;
overlaying the content onto a real world view via a display to form augmented reality (AR) content, wherein the AR content comprises the content merged with the real world view;
displaying the AR content via the display;
receiving user input indicative of a request to enlarge, shrink, or move the content with respect to the real world view within the AR content after the AR content has been displayed; and
enlarging, shrinking, or moving the content with respect to the real world view based on the user input.

10. The method of claim 9, wherein the background is defined as a layer within the language file or by one or more alpha channels within the language file.

11. The method of claim 9, comprising capturing the real world view via a camera.

12. The method of claim 9, comprising:
detecting via a camera or a sensor, a change in orientation associated with the real world view; and
modifying the content based on the change in orientation.

13. The method of claim 9, wherein the content comprises at least one image, wherein the method comprises:
receiving a second user input to:
modify a thickness of one or more lines within the at least one image;
re-color the at least one image;
highlight a portion of the at least one image; or
a combination thereof; and
modifying the AR content based on the second user input.

14. A non-transitory, computer-readable medium, comprising processor-implementable instructions, wherein the instructions are configured to cause a processor to:
receive a language file comprising content;
determine a background associated with the content, wherein the background is defined as a layer within the language file or by one or more alpha channels within the language file;
remove the background;
retrieve the content;
receive a real world view;
overlay the content onto the real world view to form augmented reality (AR) content; and
display the AR content via a display operatively coupled to the processor.

15. The non-transitory, computer-readable medium of claim 14, wherein the instructions are configured to retrieve the real world view from a camera of an electronic device that comprises the processor.

16. The non-transitory, computer-readable medium of claim 14, wherein the instructions are configured to cause the processor to:
receive user input indicative of an annotation associated with the content; and
display the annotation in the AR content based on the user input.

17. The non-transitory, computer-readable medium of claim 16, wherein the annotation comprises handwriting or a hand-drawn drawing.

18. The non-transitory, computer-readable medium of claim 14, wherein the content comprises at least one image, wherein the instructions are configured to cause the processor to:
determine that a portion of the at least one image corresponds to a portion of the real world view; and
indicate, via the display, that the portion of the at least one image corresponds to the portion of the real world view.

19. The non-transitory, computer-readable medium of claim 14, wherein the instructions are configured to cause the processor to:
receive user input indicative of a request to enlarge, shrink, or move the content after the AR content has been displayed; and
enlarge, shrink, or move the content based on the user input.

20. The non-transitory, computer-readable medium of claim 14, wherein the instructions are configured to cause the processor to capture a screenshot of the AR content.

* * * * *